United States Patent
Ittycheriah et al.

(10) Patent No.: US 9,817,808 B2
(45) Date of Patent: Nov. 14, 2017

(54) TRANSLATION USING RELATED TERM PAIRS

(71) Applicant: International Business Machines Corporation, Armonk, NY (US)

(72) Inventors: Abraham P. Ittycheriah, Yorktown Heights, NY (US); Cezar Pendus, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 14/500,442

(22) Filed: Sep. 29, 2014

(65) Prior Publication Data
US 2017/0300475 A1    Oct. 19, 2017

(51) Int. Cl.
*G06F 17/28*    (2006.01)
*G06F 17/27*    (2006.01)

(52) U.S. Cl.
CPC ............. *G06F 17/27* (2013.01); *G06F 17/28* (2013.01)

(58) Field of Classification Search
CPC ............ G06F 17/2854; G06F 17/2836; G06F 17/289; G06F 17/2735; G06F 17/2818; G06F 17/2845; G06F 17/30982; G06F 2212/1016; G06F 17/28; G06F 17/2809; G06F 17/2872
See application file for complete search history.

(56) References Cited

U.S. PATENT DOCUMENTS

| | | | | |
|---|---|---|---|---|
| 6,345,243 B1* | 2/2002 | Clark | .................. | G06F 17/2836 704/2 |
| 7,739,102 B2 | 6/2010 | Bender | | |
| 7,895,030 B2 | 2/2011 | Al-Onaizan et al. | | |
| 9,342,503 B1* | 5/2016 | Evans | .................. | G06F 17/2827 |
| 2004/0167768 A1* | 8/2004 | Travieso | ............... | G06F 17/289 704/2 |
| 2004/0186706 A1* | 9/2004 | Itoh | ........................ | G06F 17/271 704/10 |
| 2007/0124133 A1* | 5/2007 | Wang | .................. | G06F 17/2818 704/10 |
| 2008/0040096 A1* | 2/2008 | Osada | .................. | G06F 17/2827 704/3 |
| 2008/0228464 A1* | 9/2008 | Al-Onaizan | .......... | G06F 17/289 704/3 |
| 2009/0132969 A1 | 5/2009 | Mayer | | |
| 2009/0158137 A1* | 6/2009 | Ittycheriah | ............ | G06F 17/289 715/234 |

(Continued)

FOREIGN PATENT DOCUMENTS

WO    2006137993 A2    12/2006

OTHER PUBLICATIONS

N. Kambhatla, "Minority Vote: At-Least-N Voting Improves Recall for Extracting Relations" Proceedings of the COLING/ACL 2006 Main Conference Poster Sessions, Jul. 2006, pp. 460-466.

*Primary Examiner* — Abdelali Serrou
(74) *Attorney, Agent, or Firm* — Yeen Tham; Ryan, Mason & Lewis, LLP (57) ABSTRACT

A method includes translating a source to generate a translated source, extracting a set of terms from one of the source and the translated source comprising at least a first term and a second term related to the first term, comparing the extracted set of terms with at least one translation pair, and determining a correct translation based on the comparison.

20 Claims, 7 Drawing Sheets

(56) References Cited

U.S. PATENT DOCUMENTS

| | | | | |
|---|---|---|---|---|
| 2009/0248422 A1* | 10/2009 | Li | ............... | G06F 17/2827 |
| | | | | 704/277 |
| 2010/0088085 A1* | 4/2010 | Jeon | ............... | G06F 17/2818 |
| | | | | 704/7 |
| 2010/0169433 A1* | 7/2010 | Daniels | ............... | H04L 69/08 |
| | | | | 709/206 |
| 2011/0040552 A1* | 2/2011 | Van Guilder | ......... | G06F 17/246 |
| | | | | 704/4 |
| 2012/0323554 A1 | 12/2012 | Hopkins et al. | | |

* cited by examiner

TRANSLATION USING RELATED TERM PAIRS

STATEMENT OF GOVERNMENT RIGHTS

This invention was made with Government support under contract No.: HR0011-08-C-0110 awarded by Defense Advanced Research Projects Agency (DARPA). The Government has certain rights in this invention.

FIELD

The present application relates generally to machine translation and, more particularly, to techniques for determining a correct translation by using related translation pairs.

BACKGROUND

Machine translation (MT) is a growing field in translation wherein the translation from one language to another is performed by a computer typically without human interaction. MT can be used to automatically translate sources such as speech, text, audio, web page, online article, social media post, tweet, and etc.

Two common MT techniques used today are rule-based MT and statistical MT. In rule-based MT, linguistic structures and grammatical rules are taken into account along with special bilingual dictionaries to translate sentences from a source language to a target language. Statistical MT generates translations based on statistical models whose parameters are derived from the analysis of bilingual text corpora.

In either rule-based or statistical MT system, translating may involve transliteration of at least one or more words. Transliteration is a character-by-character translation technique wherein characters of a given language are matched with corresponding characters of another language. The MT system may resort to transliteration due to an incorrect spelling in the source or the word being unknown to the MT system. Transliteration is highly error prone and typically requires human intervention for accurate translation.

SUMMARY

Embodiments of the invention provide techniques for machine translation using related translation pairs.

For example, in one embodiment of the invention, a method comprises steps of translating a source to generate a translated source, extracting a set of terms from one of the source and the translated source comprising at least a first term and a second term related to the first term, comparing the extracted set of terms with at least one translation pair and determining a correct translation based on the comparison.

In additional embodiments, an article of manufacture comprises a computer readable storage medium for storing computer readable program code. The computer readable program code, when executed, causes a computer to translate a source to generate a translated source, extract a set of terms from one of the source and the translated source comprising at least a first term and a second term related to the first term, compare the extracted set of terms with at least one translation pair and determine a correct translation based on the comparison.

In further embodiments, an apparatus comprises a memory and a processor operatively coupled to the memory. The processor is configured to translate a source to generate a translated source, extract a set of terms from one of the source and the translated source comprising a first term and a second term related to the first term, compare the extracted set of terms with at least one translation pair and determine a correct translation based on the comparison.

Advantageously, illustrative embodiments of the invention extract from one of the source and the translated source a set of conceptually and/or semantically related terms. Furthermore, illustrative embodiments of the invention compare the extracted set of terms with conceptually and/or semantically related translation pairs obtained from a database of translation pairs. Still further, illustrative embodiments of the invention compare the extracted set of terms with conceptually and/or semantically related translation pairs obtained from a web content including terms similar to the extracted set of terms.

These and other objects, features, and advantages of the present invention will become apparent from the following detailed description of illustrative embodiments thereof, which is to be read in connection with the accompanying drawings.

DETAILED DESCRIPTION

Illustrative embodiments of the invention may be described herein in the context of illustrative methods, systems and devices for machine translation using related translation pairs. However, it is to be understood that embodiments of the invention are not limited to the illustrative methods, systems and devices but instead are more broadly applicable to other suitable methods, systems and devices.

As illustratively used herein, the term "source" refers to any form of communication that is subject to may be translated by machine translation (e.g., audio recording, text, image containing text, etc.).

As illustratively used herein, the term "translation pair" refers to a pair of words that are conceptually and/or semantically related.

Embodiments of the invention provide systems, devices and methods which allow for improved machine translation.

In some embodiments, an improved machine translation is performed by extracting from one of the source and the translated source at least a first term and a second term related to the first term. The extracted set of terms is compared with at least one translation pair and a correct translation is determined based on the comparison. In some instances, the extracted set of terms is compared with at least one translation pair obtained from a web content including the terms similar to the extracted set of terms.

Figure 1:
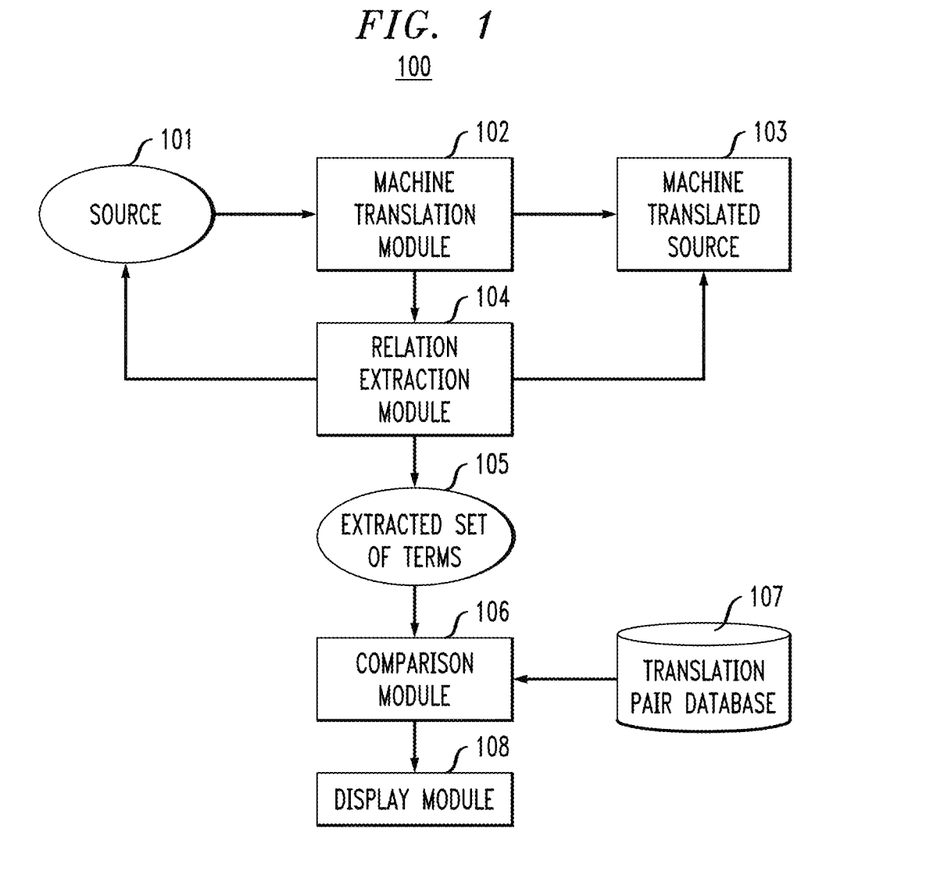
FIG. 1 depicts a machine translation system using related translation pairs according to an embodiment of the invention.

FIG. 1 illustrates a system 100 configurable to perform machine translation according to an embodiment of the invention. As shown, the system 100 includes a machine translation module 102, a relation extraction module 104, a comparison module 106 and a display module 108. The system 100 is configured to receive as input a source 101 and generate a machine translated source 103. The system 100 is further configured to obtain one or more translation pairs from a translation pair database 107. Alternative embodiments of the system 100 may comprise more or less functionally equivalent modules. All modules can be integrated within a single system or within multiple systems which may be remotely located. Each of the machine translation module 102, relation extraction module 104, comparison module 106 and display module 108 may be implemented using hardware, software or a combination of hardware and software running on one or more computing or other processing devices.

As shown in FIG. 1, the machine translation module 102 is configured to receive as input a source 101 for translation. As defined above, a source may be any form of communication that may be translated by machine translation. The source 101 may comprise, but is not limited to, a text, an audio recording or a visual image containing text. Examples of text may include a word or phrase, a simple sentence or a more complex newspaper article. The source 101 may comprise an audio recording of a lecture or a speech delivered by a person. The source 101 may further comprise a screen-shot image containing text such as a screen-shot of a web page or a social media post (e.g., Tweet, Facebook post, etc.).

The machine translation module 102 may be configured to translate each word or phrase in a source into another language by mapping each word or phrase in the source to matching words or phrases in a target language. Translation may be performed based on a predetermined translation algorithm and methodology which will not be described further since it is not the focus of embodiments of the present invention. The machine translation module 102 performs the translation algorithm and outputs a translation in the target language.

The relation extraction module 104 extracts a set of terms 105 from either the source 101 or from the machine translated source 103. A first term may be any word from the source 101 but the second term is a word conceptually and/or semantically related to the first term from the source 101. Alternatively, a first term may be any word from the machine translated source 103 but the second term is a word conceptually and/or semantically related to the first term from the machine translated source 103. The relation extraction module 104 may further extract additional terms which are conceptually and/or semantically related to the first term.

The relationship between the first term and the second term may be an "is-a" relationship. The second term may be related to the first term by arrangement and grammatical structures in the source language. A well-known method of extracting relations is discussed in N. Kambhatla, "Minority Vote: At-Least-N Voting Improves Recall for Extracting Relations," Proceedings of the COLING/ACL 2006 Main Conference Poster Sessions, pages 460-466, 2006, the disclosure of which is incorporated by reference herein in its entirety.

The comparison module 106 receives the extracted set of terms 105 from the relation extraction module 104 and obtains at least one related translation pair from the translation pair database 107. A translation pair may be, but is not limited to, a set of words that are paired together based on conceptual and/or semantic relationship. For example, the translation pair may be a pair of words sharing the same meaning across two languages (i.e., the word "water" in English and the word "agua" in Spanish). The translation pair may also be a pair of words with conceptual relevance (i.e., "Curiosity" and "spacecraft"). The comparison module 106 may obtain the related translation pair by searching within the database 107 for a conceptually and/or semantically relevant translation pair to the extracted set of terms. The comparison module 106 determines whether the translation is correct based on comparing the extracted set of terms with the related translation pair.

The display module 108 displays the correct translation of the source. The display module 108 may comprise a computer monitor, a mobile device, etc. The display module may be configured to display only the correct translation or the correct translation with the translation pair used to determine the correct translation.

Figure 2:
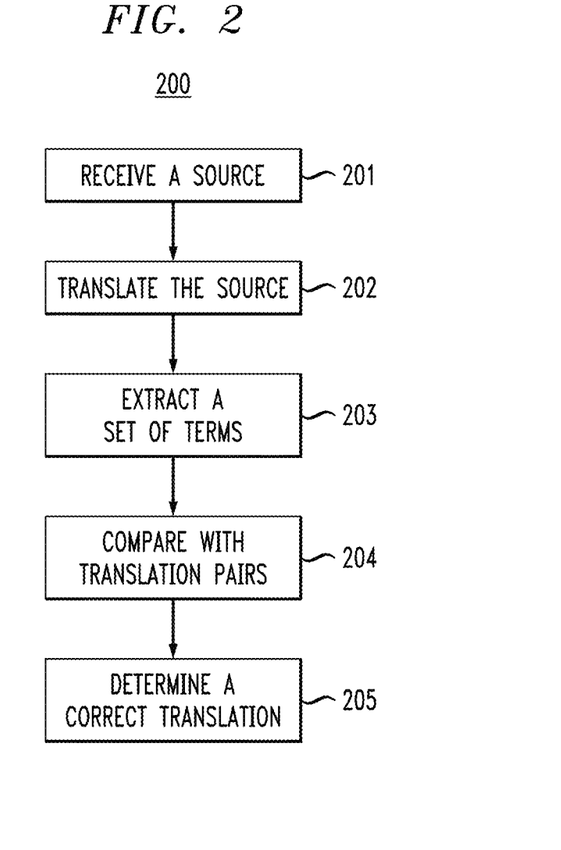
FIG. 2 depicts a machine translation methodology using related translation pairs according to an embodiment of the invention.

FIG. 2 illustrates a flow chart 200 depicting a methodology of machine translation using related translation pairs according to an embodiment of the invention.

In step 201, a machine translation system (e.g., system 100 in FIG. 1) receives a source that needs to be translated. As indicated above, the source may be a text, an audio recording or a visual image containing text.

In step 202, the system performs translation based on a predetermined translation algorithm. The translation results in a machine translated version of the source.

In step 203, the system extracts a set of terms from one of the source and the translated source.

In step 204, the system compares the extracted set of terms with at least one translation pair obtained from the translation pair database 107 as shown in FIG. 1.

In step 205, the system determines a correct translation based on the comparison in step 204.

Above disclosed methods and systems are particularly advantageous when the machine translation results in one or more transliterated terms. Transliteration occurs when a word or phrase in the source cannot be matched with any words or phrases of the target language in a machine translation system. Transliteration normally occurs when the word or phrase in the source is a proper noun or even when the word or phrase in the source is misspelled or newly coined and the system does not recognize the word or phrase.

In accordance with FIG. 1, the source 101 may contain one or more proper nouns not known in the system. The machine translated source 103 will comprise at least one or more transliterated terms. Advantageously, the relation extraction module 104 can extract the transliterated term from machine translated source 103 as the first term. Normally, the transliterated term is meaningless. It is only a character-by-character matching from one language to another. A second term, which is conceptually and/or semantically related to the transliterated term is found using algorithms such as the one disclosed by Kambhatla. The extracted set of terms 105 now includes at least one transliterated term and one other related term. The comparison module 106 obtains at least one conceptually and/or semantically related translation pair from the translation pair database 107 and determines a correct translation for the transliterated word in the source 101.

A simple transliteration example will now delineate steps 201-205 in FIG. 2. In step 201, assume the system receives a following sentence about the space vehicle Curiosity in Arabic:

الإستكشافية، كيريوسيتي ، كانت تعمل فوق

(1) المريخ بالأمس مركبة الفضاء

In step 202, the system translates (1) into English based on a predetermined translation algorithm. The result is as follows:

Exploratory space vehicle, *Kiryoshiti*, was working on Mars yesterday (2)

In step 203, the system extracts from (2) a set of terms which includes "Kiryoshiti" and at least one related term such as "space vehicle" and/or "Mars." In step 204, the system compares the extracted set of terms with at least one translation pair obtained from the translation pair database 107 as shown in FIG. 1. One translation pair obtained may be "Curiosity and spacecraft." Another pair may be "Curiosity and Mars." In step 205, the system determines based on comparing the extracted set of terms "Kiryoshiti and space vehicle" with the obtained translation pair "Curiosity and spacecraft," that "Kiryoshiti" is indeed "Curiosity."

In the above described embodiments and examples, the translation pair database 107 plays a crucial role in providing the necessary translation pairs to the comparison module 106 for a determination of a correct translation. In accordance with FIG. 3, the steps of building the translation pair database will be described in detail.

Figure 3:
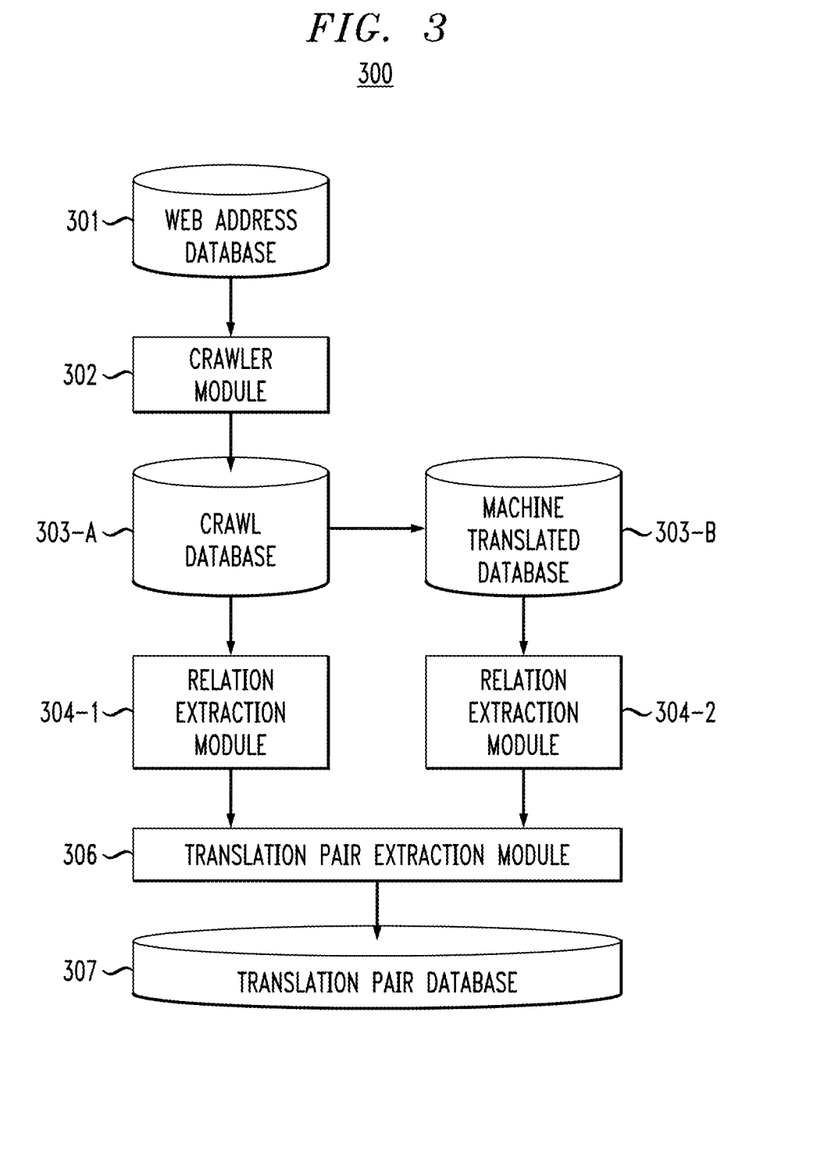
FIG. 3 depicts a process for building a translation pair database according to an embodiment of the invention.

The system 300 comprises a crawler module 302, a plurality of relation extraction module 304 and a translation pair extraction module 306. The crawler module 302 is connected to a web address database 301. The web address database 301 stores a list of web addresses relating to an area of study, a topic of interest, a particular field of technology, and etc. For example, if the source to be translated is in the field of engineering, the web address database may comprise web addresses from one or more engineering websites. Alternatively, if the topic is current affairs, the web address database may comprise web addresses from one or more news websites.

The crawler module 302 crawls every web addresses listed in the web address database 301 and collects articles and publications from the web addresses in a source language and in a target language. For example, if a source written in English about an Israeli ambassador is to be translated into Arabic, the crawler module 302 may go to a given news website and collect the articles published in English about the ambassador and the articles published in Arabic about that ambassador and store the articles into a crawl database 303-A.

Once the crawl database 303-A is built, the system then builds a machine translated database 303-B. For example, every article published in English and stored in the crawl database 303-A is machine translated into Arabic and stored into the machine translated database 303-B and every article published in Arabic and stored in the crawl database 303-A is machine translated into English and stored into the machine translated database 303-B.

Next, a plurality of relation extraction modules extract a set of related terms from each database 303-A and 303-B. For example, the relation extraction module 304-1 may extract a set of conceptually and/or semantically related terms from articles published in English and stored in database 303-A. The relation extraction module 304-1 may extract another set of conceptually and/or semantically related terms from articles published in Arabic and stored in database 303-A. Corresponding steps are performed for the machine translated articles in English and Arabic and stored in database 303-B and relation extraction module 304-2. A different relation extraction module may be assigned to each language in either database 303-A or 303-B.

The extracted sets of terms are sent to a translation pair extraction module 306. The translation pair extraction module 306 compares sets of extracted terms from both databases and creates a translation term pair. For example, a translation pair may be any pair of words ranging from name of the ambassador, "Shlain," the country that the ambassador is from, "Israel," or visiting, "Washington," or simply, "ambassador" or "diplomat."

One or more translation pairs created by the translation pair extraction module 306 is stored into a translation pair database 307, which also corresponds to the database 107 in FIG. 1.

The above example is described with translating a source from English to Arabic about a particular topic using a topically concentrated translation pair database. However, the example is not intended to be limiting the invention in any way. Ideally, the web address database will contain every web address known to man and the translation pair database will have a thoroughly stacked list of translation pairs. The invention may be practiced with any subset of topics for databases without departing from the scope or spirit of the invention.

In some embodiments, the translation pair database 107 may not be able provide a conceptually and/or semantically related translation pair for a comparison. The translation pair database 107 may not have been adequately built or is built for a different field of knowledge. In such embodiments, step 204 in FIG. 2 may further comprise a step for real-time searching on the web for additional resources. This step is described in more detail with FIG. 4.

Figure 4:
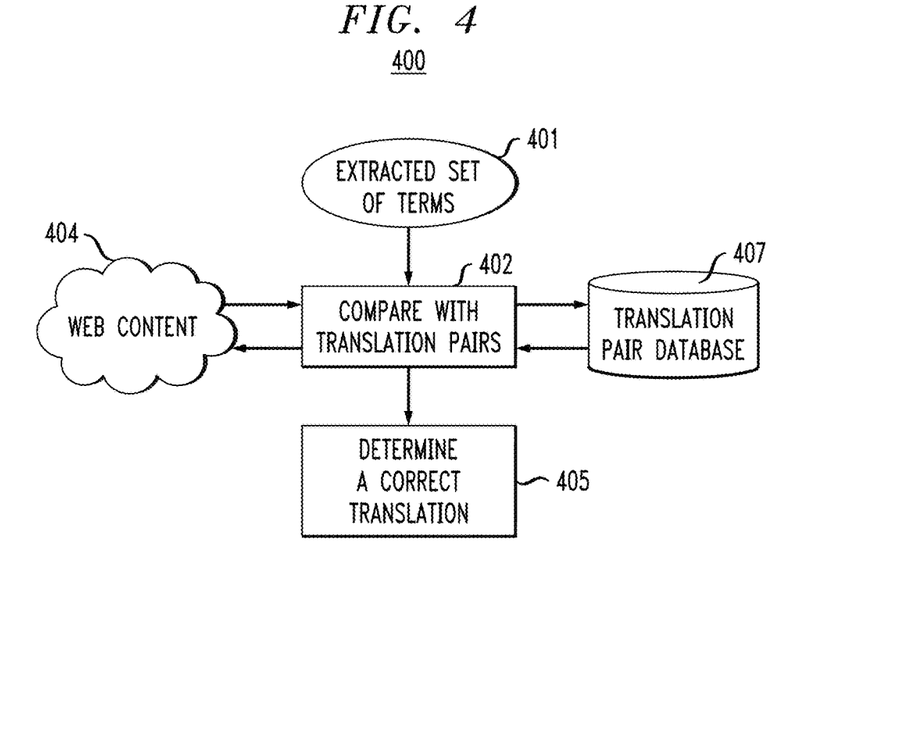
FIG. 4 depicts processes for obtaining a web content containing terms similar to an extracted set of terms according to an embodiment of the invention.

FIG. 4 illustrates a system 400 with steps for obtaining additional term pairs on the web. Step 401 corresponds to step 203 in FIG. 2 wherein a set of terms is extracted from one of the source or the translated source comprising a first term and a second term related to the first term. In step 402, the extracted set of terms is compared with at least one translation pair from the translation pair database 407, which corresponds to database 107 in FIG. 1. However, the system 400 is unable to obtain a related translation pair from the translation pair database 407. In step 404, a web search is performed for any content including terms similar to the extracted set of terms. Step 404 may comprise searching for a web page, an online article, a web document, or a social media post. For the example above regarding the space vehicle Curiosity, the additional web search may find in a tweet a statement:

The space vehicle Curiosity was active on Mars yesterday (3)

Figure 5:
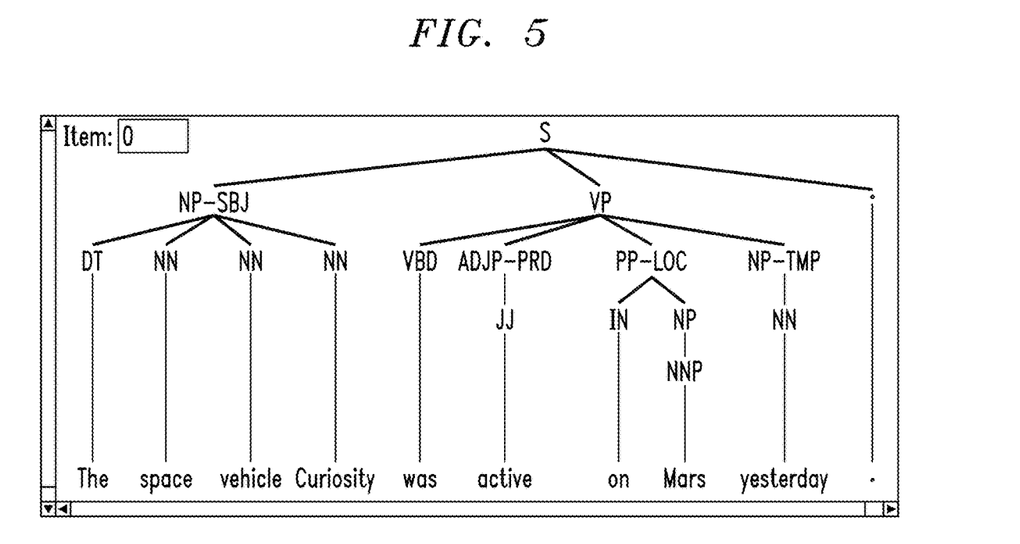
FIG. 5 depicts an example of relation extraction using a well-known technique.

A pair of terms such as "Curiosity and space vehicle" or "Curiosity and Mars" is extracted from (3). This relation extraction may be performed using well-known algorithms such as the Kambhatla method. This extraction is illustrated in FIG. 5. The tree structure in FIG. 5 juxtaposes the term "space vehicle" with "Curiosity." Based on this information, a translation pair "Curiosity and space vehicle" is created and sent to the comparison module to be compared with the extracted set of terms 401 in FIG. 4. A correct translation is determined and the result of the additional web search is stored into the translation pair database 407 for future uses.

The above example illustrates an instance when the translation pair database fails to provide a related translation pair. However, the additional web search may be performed regardless and provide more updated translation pair for comparison. For example, in FIG. 4, the step 402 may comprise comparing the extracted set of terms with at least one translation pair obtained from the translation pair database 407 and at least one translation pair obtained from the web content 404.

Figure 6A:
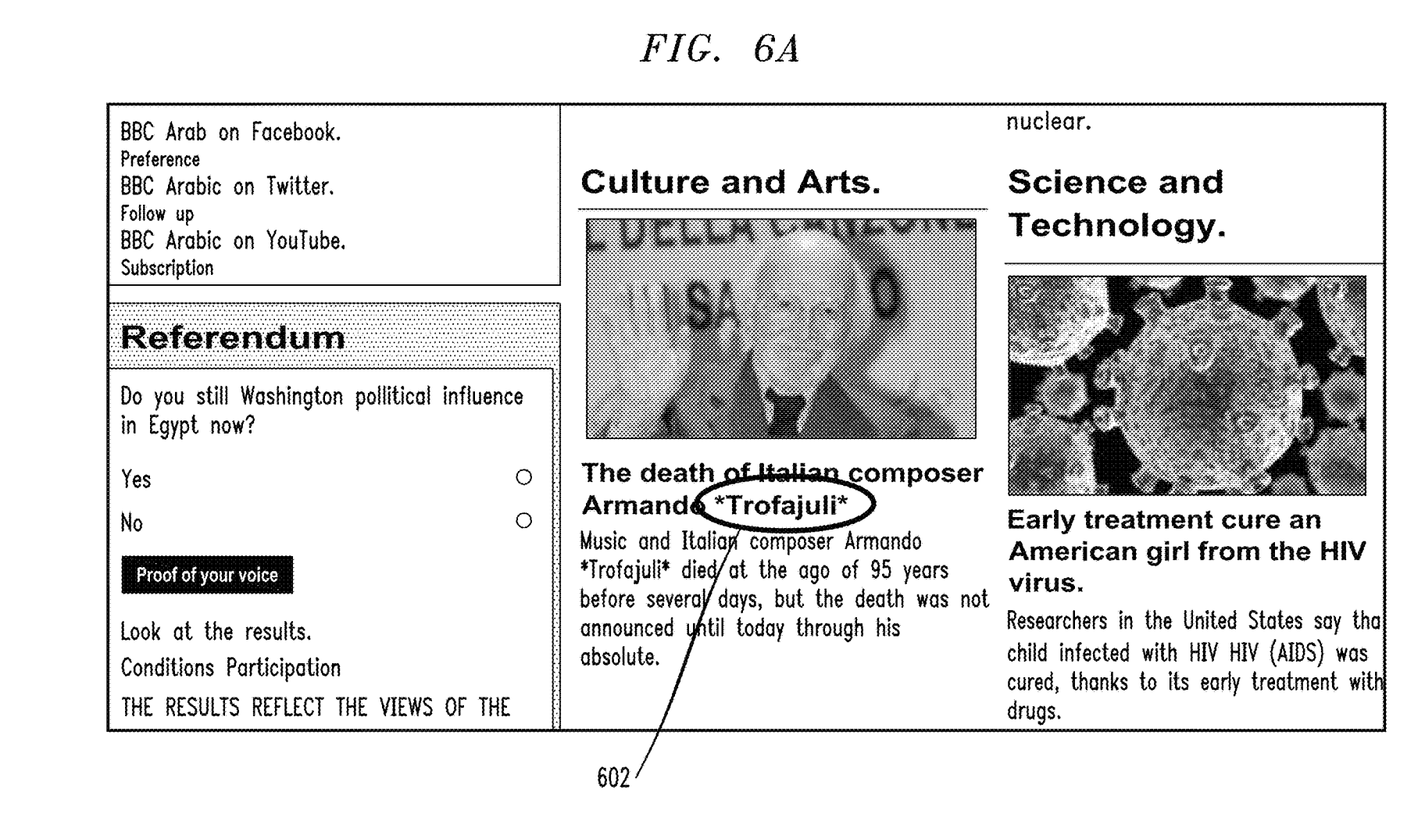
FIG. 6a depicts a machine translation example of a web page according to an embodiment of the invention.
Figure 6B:
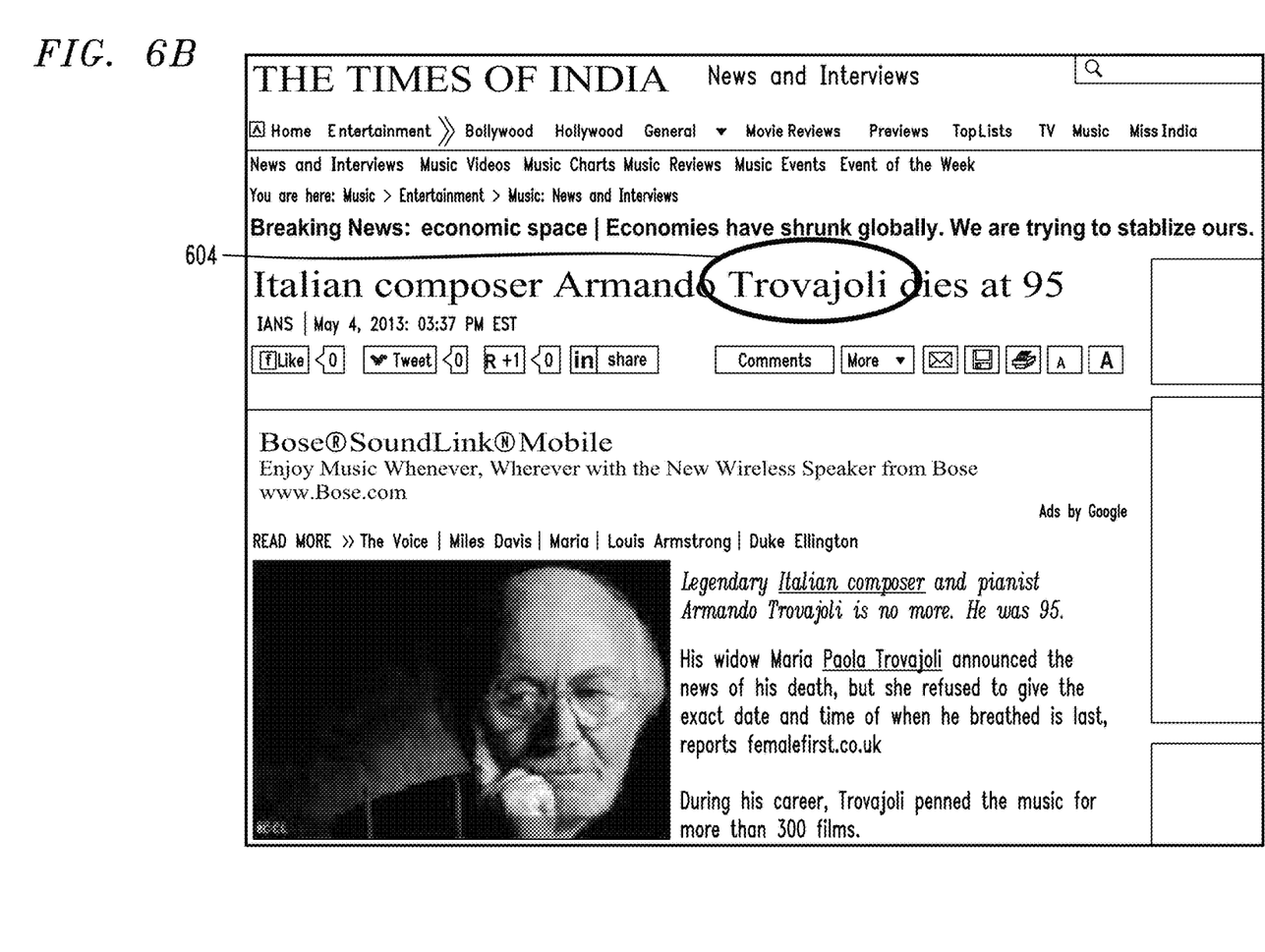
FIG. 6b depicts a related web page containing a term similar to the extracted set of terms according to an embodiment of the invention.

FIGS. 6*a* and 6*b* illustrate another example of machine translation system according to an embodiment of the invention. FIG. 6*a* is an image of a machine translated web page containing a current article about the death of an Italian composer named Armando Trovajoli. As pointed out in 602, it is assumed the machine translation resulted in transliterating the surname for this Italian composer, as "Trofajuli." FIG. 6*a* may correspond to steps 201-202 illustrated above in FIG. 2. The system extracts the term "Trofajuli" along with one or more conceptually and/or semantically related terms such as "Italian" or "composer." The system then searches the translation pair database or the web for any content including terms similar to "Trofajuli" and other related terms. FIG. 6*b* shows a result of the web search which is an image of a different web page announcing the death of the same Italian composer. As pointed out in 604, the surname is spelled "Trovajoli." The system compares 602 with 604, along with one or more related terms, and determines that a correct translation for this Italian composer is "Armando Trovajoli," not "Armando Trofajuli."

In some embodiments of the invention, the display module 108 in FIG. 1 may display only the final correct translation for the source. In other embodiments, the display module 108 may present a user with an option to accept or reject a suggestion for the correct translation. The user may select a term in the source (i.e., by hovering over the term with a mouse) and the display module 108 may present a suggestion for the translation of the selected term by displaying one or more conceptually and/or semantically related translation pairs obtained from the translation pair database or the web. The display module 108 may still further comprise a link to the web content containing terms similar to the extracted set of terms or display the web content itself. The display module 108 may display the machine translation in one window and display the obtained translation pairs for suggestion, the link to the web content or the web content itself in a pop-up window.

Embodiments of the present invention may be a system, a method, and/or a computer program product. The computer program product may include a computer readable storage medium (or media) having computer readable program instructions thereon for causing a processor to carry out aspects of the present invention.

Figure 7:
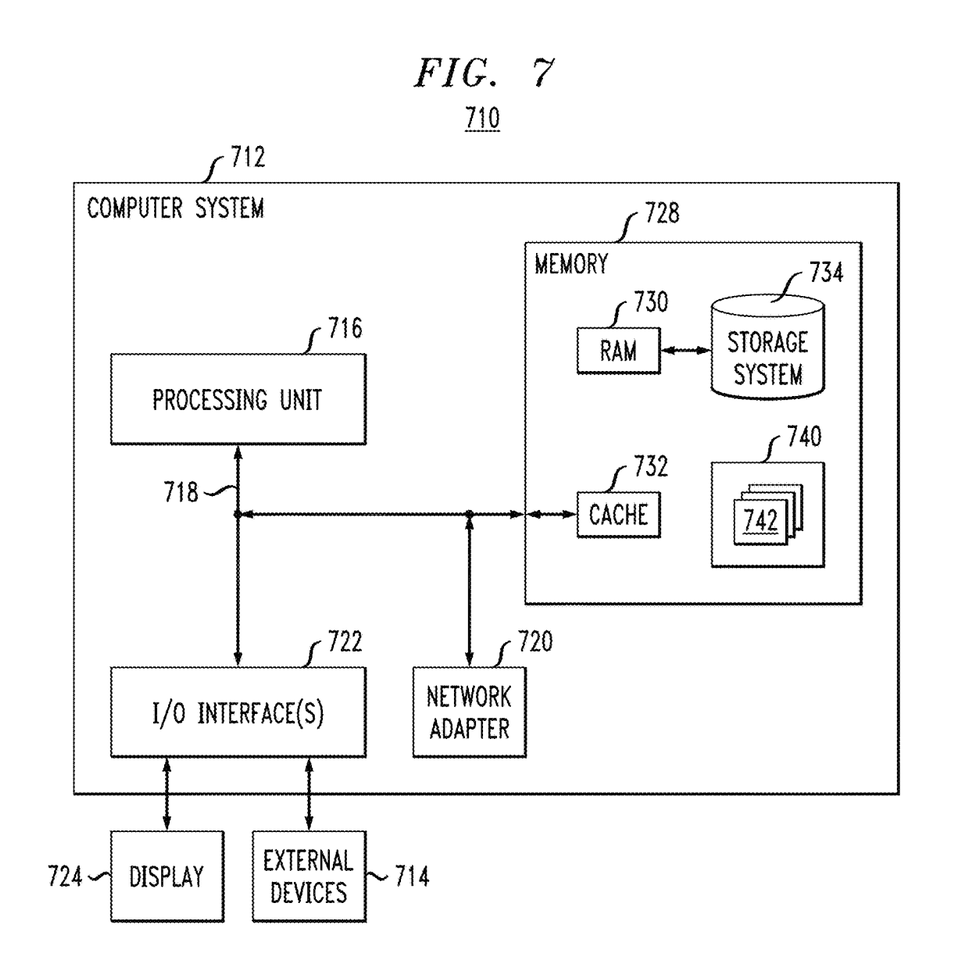
FIG. 7 depicts a computer system in accordance with which one or more components/steps of techniques of the invention may be implemented according to an embodiment of the invention.

Accordingly, the architecture shown in FIG. 7 may be used to implement the various components/steps shown and described above in the context of FIGS. 1-6.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments can make use of software running on a general-purpose computer or workstation. With reference to FIG. 7, in a computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 712 typically includes a variety of computer system readable media. Such media may be any available media that is accessible by computer system/server 712, and it includes both volatile and non-volatile media, removable and non-removable media.

The system memory 728 can include computer system readable media in the form of volatile memory, such as random access memory (RAM) 730 and/or cache memory 732. The computer system/server 712 may further include other removable/non-removable, volatile/nonvolatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As depicted and described herein, the memory 728 may include at least one program product having a set (e.g., at least one) of program modules that are configured to carry out the functions of embodiments of the invention. A program/utility 740, having a set (at least one) of program modules 742, may be stored in memory 728 by way of example, and not limitation, as well as an operating system, one or more application programs, other program modules, and program data. Each of the operating system, one or more application programs, other program modules; and program data or some combination thereof, may include an implementation of a networking environment. Program modules 742 generally carry out the functions and/or methodologies of embodiments of the invention as described herein. Computer system/server 712 may also communicate with one or more external devices 714 such as a keyboard, a pointing device, a display 724, etc., one or more devices that enable a user to interact with computer system/server 712, and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples include, but are not limited to, microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising steps of:
generating a translation pair database, wherein generating the translation pair database comprises:
building a crawl database by crawling one or more web addresses listed in a web address database, and collecting one or more documents associated with a source language and one or more documents associated with a target language;
building a machine translated database by translating the one or more documents associated with a source language into a target language and the one or more documents associated with the target language into the source language;
extracting one or more sets of related terms from the crawl database and one or more sets of related terms from the machine translated database; and
building the translation pair database by comparing the sets of related terms extracted from the crawl database and the machine translated database to generate one or more translation pairs;
translating a communication received from a device and associated with the source language to generate a translated communication associated with the target language, wherein the translated communication comprises a transliterated term; and
providing a correct translation for the transliterated term to the device, wherein providing the correct translation for the transliterated term to the device comprises:
extracting a set of terms from one of the received communication and the translated communication, the set of terms comprising the transliterated term and a term related to the transliterated term;
obtaining at least one translation pair from the translation pair database;
comparing the extracted set of terms with the at least one translation pair to identify at least one candidate translation for the transliterated term; and
selecting the correct translation for the transliterated term from the at least one candidate translation, wherein the correct translation selected from the at least one candidate translation is provided to the device;
wherein the steps of the method are performed by at least one processor device coupled to a memory.

2. The method of claim 1, wherein the one or more sets of related terms are extracted based on an "is-a" relationship.

3. The method of claim 1, wherein the at least one translation pair is obtained by steps of:

locating web content including terms similar to the extracted set of terms;
performing machine translation on the web content to generate a machine translation of the web content;
extracting a first set of terms related to the extracted set of terms from the web content;
extracting a second set of terms related to the extracted set of terms from the machine translation of the web content; and
creating the at least one translation pair based on a comparison of the extracted first set of terms and the extracted second set of terms.

4. The method of claim 3, wherein the web content comprises at least one of a web page, an article, a document and a social media post.

5. The method of claim 3, wherein the at least one translation pair is stored into the translation pair database.

6. The method of claim 1, wherein the comparing step further comprises comparing the extracted set of terms with at least one translation pair obtained from the translation pair database and at least one translation pair obtained from web content.

7. The method of claim 1, further comprising selecting a term from one of the received communication and the translated communication.

8. The method of claim 7, wherein providing the correct translation for the transliterated term to the device further comprises presenting the selected term and a list of suggestions for a correct translation of the selected term comprising the at least one obtained translation pair.

9. The method of claim 8, wherein the list of suggestions further comprises at least one of the web content and a link to the web content.

10. An apparatus comprising:
a memory; and
a processor operatively coupled to the memory and configured to:
generate a translation pair database by:
building a crawl database by crawling one or more web addresses listed in a web address database, and collecting one or more documents associated with a source language and one or more documents associated with a target language;
building a machine translated database by translating the one or more documents associated with the source language into the target language and the one or more documents associated with the target language into the source language;
extracting one or more sets of related terms from the crawl database and one or more sets of related terms from the machine translated database; and
building the translation pair database by comparing the sets of related terms extracted from the crawl database and the machine translated database to generate one or more translation pairs;
translate a communication received from a device and associated with the source language to generate a translated communication associated with the target language, wherein the translated communication comprises a transliterated term; and
provide a correct translation for the transliterated term to the device, wherein, in providing the correct translation for the transliterated term to the device, the processor is configured to:
extract a set of terms from one of the received communication and the translated communication, the set of terms comprising the transliterated term and a term related to the transliterated term;

obtain at least one translation pair from the translation pair database;

compare the extracted set of terms with the at least one translation pair to identify at least one candidate translation for the transliterated term; and select the correct translation for the transliterated term from the at least one candidate translation, wherein the correct translation selected from the at least one candidate translation is provided to the device.

11. The apparatus of claim 10, wherein, in obtaining the at least one translation pair, the processor implements a crawler module configured to:

locate web content including terms similar to the extracted set of terms;

perform machine translation on the web content to generate a machine translation of the web content;

extract a first set of terms related to the extracted set of terms from the web content;

extract a second set of terms related to the extracted set of terms from the machine translation of the web content; and create the at least one translation pair based on a comparison of the extracted first set of terms and the extracted second set of terms.

12. The apparatus of claim 11, wherein the crawler module further comprises a web address database.

13. The apparatus of claim 10, wherein the processor is further configured to receive a selection of a term from one of the received source and the translated source.

14. The apparatus of claim 13, wherein, in providing the correct translation for the transliterated term to the device, the processor is further configured to present the received selection of the term and a list of suggestions for a correct translation of the received selection of the term comprising the at least one obtained translation pair.

15. An article of manufacture comprising a non-transitory computer readable storage medium for storing computer readable program code which, when executed, causes a computer to:

generate a translation pair database by:
building a crawl database by crawling one or more web addresses listed in a web address database, and collecting one or more documents associated with a source language and one or more documents associated with a target language;
building a machine translated database by translating the one or more documents associated with the source language into the target language and the one or more documents associated with the target language into the source language;
extracting one or more sets of related terms from the crawl database and one or more sets of related terms from the machine translated database; and
building the translation pair database by comparing the sets of related terms extracted from the crawl database and the machine translated database to generate one or more translation pairs;

translate a communication received from a device and associated with the source language to generate a translated communication associated with the target language, wherein the translated communication comprises a transliterated term; and provide a correct translation for the transliterated term to the device, wherein the providing of the correct translation for the transliterated term to the device comprises program code that causes the computer to:
extract a set of terms from one of the received source and the translated source, the set of terms comprising the transliterated term and a term related to the transliterated term;
obtain at least one translation pair from the translation pair database;
compare the extracted set of terms with at least one translation pair to identify at least one candidate translation for the transliterated term; and
select the correct translation for the transliterated term from the at least one candidate translation, wherein the correct translation selected from the at least one candidate translation is provided to the device.

16. The apparatus of claim 10, wherein the one or more sets of related terms are extracted based on an "is-a" relationship.

17. The apparatus of claim 11, wherein the web content comprises at least one of a web page, an article, a document and a social media post.

18. The apparatus of claim 11, wherein the at least one translation pair is stored into the translation pair database.

19. The apparatus of claim 10, wherein, in comparing the extracted set of terms with at least one translation pair, the processor is further configured to compare the extracted set of terms with at least one translation pair obtained from a translation pair database and at least one translation pair obtained from web content.

20. The apparatus of claim 19, wherein the list of suggestions further comprises at least one of the web content and a link to the web content.

* * * * *